United States Patent
Sakabe et al.

(10) Patent No.: US 11,485,821 B2
(45) Date of Patent: Nov. 1, 2022

(54) METHOD FOR PRODUCING POLYARYLETHERKETONE

(71) Applicant: Kureha Corporation, Tokyo (JP)

(72) Inventors: Hiroshi Sakabe, Tokyo (JP); Tasutaka Suzuki, Tokyo (JP); Akiko Wakamatsu, Tokyo (JP); Kenji Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/314,537

(22) PCT Filed: Oct. 11, 2018

(86) PCT No.: PCT/JP2018/037917
§ 371 (c)(1),
(2) Date: Dec. 31, 2018

(87) PCT Pub. No.: WO2019/074056
PCT Pub. Date: Apr. 18, 2019

(65) Prior Publication Data
US 2020/0399425 A1 Dec. 24, 2020

(30) Foreign Application Priority Data

Oct. 12, 2017 (JP) .............................. JP2017-198718

(51) Int. Cl.
*C08G 65/40* (2006.01)
*C08G 65/46* (2006.01)
*C08K 5/3415* (2006.01)

(52) U.S. Cl.
CPC ..... *C08G 65/4012* (2013.01); *C08G 65/4093* (2013.01); *C08G 65/46* (2013.01); *C08K 5/3415* (2013.01)

(58) Field of Classification Search
None
See application file for complete search history.

(56) References Cited

U.S. PATENT DOCUMENTS

| 5,223,585 | A | * | 6/1993 | Mizuno | ...................... C08J 5/18 |
| | | | | | 264/290.2 |
| 5,886,080 | A | * | 3/1999 | Mori | ........................ C08K 7/20 |
| | | | | | 524/495 |
| 7,217,780 | B2 | | 5/2007 | Toriida et al. | |
| 2014/0128565 | A1 | | 5/2014 | Ichinose et al. | |
| 2015/0209736 | A1 | * | 7/2015 | Ohkame | ................. C02F 1/441 |
| | | | | | 210/490 |

FOREIGN PATENT DOCUMENTS

| CN | 101186695 | A | 5/2008 |
| CN | 103450478 | A | 12/2013 |
| JP | H07138360 | A | 5/1995 |
| JP | 2003-217342 | A | 7/2003 |
| JP | 2006-111664 | A | 4/2006 |
| JP | 2010070657 | A | 4/2010 |
| JP | 2014-28933 | A | 2/2014 |
| WO | WO2003050163 | A1 | 6/2003 |
| WO | 2013/001763 | A1 | 1/2013 |

OTHER PUBLICATIONS

Office Action for JP Patent Application 2018-558359 dated Aug. 27, 2019, 7 pgs.
Extended European Search Report from EP Application No. 18819255.3 dated Jan. 13, 2020, 5 pgs.
English Translation of International Preliminary Report on Patentability from PCT Application No. PCT/JP2018/037917, dated Apr. 23, 2020, 8 pgs.
Office Action from JP Application No. 2018-558359, dated Mar. 3, 2020, 8 pgs.
Office Action from KR Application No. 10-2018-7036335, dated Jun. 17, 2020, 12 pgs.
Office Action from JP Application No. 2020-054410, dated Feb. 2, 2021, 10 pgs.
Office Action from CN Application No. 201880002472.7, dated Mar. 2, 2021, 13 pgs.
Office Action for KR Patent Application 10-2018-7036335 dated Dec. 16, 2019, 14 pgs.
Office Action from IN Application No. 201817048436, dated Aug. 31, 2020, 6 pgs.
International Search Report for PCT/JP2018/037917 dated Nov. 20, 2018, 9 pgs.
Office Action from EP Application No. 18819255.3, dated Oct. 2, 2020, 5 pgs.
Office Action from CN Patent Application No. 201880002472.7 dated Jun. 29, 2021, 10 pages.

(Continued)

*Primary Examiner* — Tae H Yoon
(74) *Attorney, Agent, or Firm* — Abel Schillinger, LLP

(57) ABSTRACT

Provided is a method that can stably produce polyaryletherketone that has a high degree of polymerization and can be easily recovered. The method for producing polyaryletherketone includes: a polycondensation step of carrying out desalting polycondensation in a reaction solvent; and a cooling step of cooling a reaction mixture after desalting polycondensation is completed. When the method is implemented, the polycondensation step is carried out in a hydrophilic solvent under pressurized conditions, and the polymerization temperature in the polycondensation step is at or above the boiling point of the hydrophilic solvent at ambient pressure. In addition, the polymer content in terms of monomers at the time of cooling in the cooling step is from 1 part by mass to 50 parts by mass, per 100 parts by mass of the hydrophilic solvent in the reaction mixture.

13 Claims, No Drawings

(56) References Cited

OTHER PUBLICATIONS

Decision of Rejection for CN201880002472.7, dated Sep. 24, 2021, 5 pages.
Office Action in an European Patent Application No. 18819255.3, dated Jul. 14, 2022, 4 pages.

* cited by examiner

METHOD FOR PRODUCING POLYARYLETHERKETONE

TECHNICAL FIELD

The present invention relates to a method for producing polyaryletherketone.

BACKGROUND ART

Polyaryletherketone (also referred to as "PAEK" below) is generally produced industrially using a desalting polycondensation method. With this desalting polycondensation method, diphenylsulfone is generally used as a solvent. However, diphenylsulfone is a solid at room temperature, and therefore a problem of the reaction mixture solidifying at room temperature through desalting polycondensation has existed. In addition, diphenylsulfone is water-insoluble. Therefore, there has been another problem of difficulties involved in purifying the PAEK that is obtained through the desalting polycondensation method and in recovering the solvent.

Therefore, in order to solve these types of problems, various production methods have been examined thus far. For example, Patent Document 1 discloses a method for producing crystalline polyether using, as the reaction solvent, N-methyl-2-pyrrolidone (NMP), which is a liquid at normal temperature and is a hydrophilic solvent.

In addition, Patent Document 2 discloses a method for obtaining high molecular weight PAEK by using a hydrophilic organic amide solvent like NMP.

Furthermore, based on the inability to stably obtain high molecular weight PAEK with the method disclosed by Patent Document 2, Patent Document 3 discloses as an improved method thereof, a method for producing polyethers that are used to produce PAEK by using a mixed solvent of a sulfolane solvent and NMP or other such hydrophilic solvents.

CITATION LIST

Patent Literature

Patent Document 1: JP H07-138360
Patent Document 2: WO 2003/050163
Patent Document 3: JP 2010-70657

SUMMARY OF INVENTION

Technical Problem

However, in the case of the method disclosed by Patent Document 1, the reaction mixture solidifies at room temperature. Therefore, in order to recover the PAEK, the solidified reaction mixture needs to be pulverized by a pulverizer or the like.

In addition, in the method disclosed by Patent Document 2, the desalting polycondensation reaction is carried out with the polymer in a precipitated state. However, with the method disclosed by Patent Document 2, it is difficult to stably produce high molecular weight polymers, and the concentration of the polymers in the obtained reaction mixture is low.

In the case of the method disclosed by Patent Document 3, the reaction mixture solidifies when cooled after the reaction. Accordingly, in this case as well, the solidified reaction mixture needs to be pulverized by a pulverizer or the like in order to recover PAEK.

Therefore, an object of one aspect of the present invention is to provide a method that can stably produce polyaryletherketone that has a high degree of polymerization and can be easily recovered.

Solution to Problem

In order to solve the abovementioned problems, a method for producing polyaryletherketone according to one aspect of the present invention includes: a polycondensation step of carrying out desalting polycondensation in a reaction solvent; and a cooling step of cooling a reaction mixture obtained in the polycondensation step after the completion of the desalting polycondensation. The polycondensation step is carried out in a hydrophilic solvent under pressurized conditions, and the polymerization temperature in the polycondensation step is at or above the boiling point of the hydrophilic solvent at ambient pressure. In addition, the polymer content in terms of monomers at the time of cooling in the cooling step is from 1 part by mass to 50 parts by mass, per 100 parts by mass of the hydrophilic solvent in the reaction mixture.

Advantageous Effects of Invention

According to one aspect of the present invention, polyaryletherketone that has a high degree of polymerization and that can be easily recovered can be stably produced.

DESCRIPTION OF EMBODIMENTS

Hereinafter, the method for producing polyaryletherketone (hereinafter, simply referred to as "the present production method") according to an embodiment of the present invention is described in detail.

First, the polycondensation step of the present production method is described.

Polycondensation Step

In the present production method, the polycondensation step is a step in which desalting polycondensation is carried out in a reaction solvent. This desalting polycondensation includes subjecting an aromatic dihalide compound and an aromatic dihydroxy compound to a polycondensation reaction in the presence of an alkali metal compound, and through this, polyaryletherketone (PAEK) is produced.

The PAEK in the present invention is not particularly limited, and may be any PAEK as long as it has a structure made from a repeating unit that includes an arylene group (residue obtained by removing, from an aromatic compound, two hydrogen atoms bonded to the aromatic ring) and a carbonyl bond; and an ether bond.

Specific examples of this type of PAEK include polyetheretherketone (PEEK), polyetherketone (PEK), polyetherketoneketone (PEKK), polyetheretherketoneketone (PEEKK), and polyetherketoneetherketoneketone (PEKEKK).

PAEK is obtained, for example, by methods described by JP S61-10486 A, JP H07-138360 A, WO 2003-050163, JP 2010-70657 A, JP 2014-532109 T.

That is, PAEK is produced by using an aromatic dihalide compound and an aromatic dihydroxy compound as well-known raw material monomers, and subjecting these raw material monomers to desalting polycondensation in a polymerization solvent along with an alkali metal carbonate, an alkali metal hydrogen carbonate, or an alkali metal hydroxide, which is a basic alkali metal compound that can form a phenolate-type salt with the aromatic dihydroxy compound.

Examples of the aromatic dihalide compound used in the polycondensation step include 4,4'-difluorobenzophenone and 4,4'-dichlorobenzophenone, but the aromatic dihalide compound is not limited thereto.

Examples of the aromatic dihydroxy compound that is used in the polycondensation step include 1,3-dihydroxybenzene (resorcin), 1,4-dihydroxybenzene (hydroquinone), 4,4'-dihydroxybiphenyl (4,4'-biphenol), 4,4'-dihydroxyterphenyl, 2,6-dihydroxynaphthalene, 1,4-dihydroxynaphthalene, 4,4'-dihydroxydiphenyl ether, 4,4'-dihydroxydiphenyl sulfone, 4,4'-dihyroxybenzophenone, and 4,4'-tetraphenyl bisphenol, but the aromatic dihydroxy compound is not limited thereto, and in addition to these, for example, bisphenol A and other various diphenols can be used.

Examples of the alkali metal compound that is used in the polycondensation step include compounds that can change the aromatic dihydroxy compound that is subjected to the polycondensation reaction to an alkali metal salt. Examples of such alkali metal compounds include alkali metal carbonates, alkali metal hydrogen carbonates, or alkali metal hydroxides of metals such as lithium, sodium, potassium, rubidium, or cesium. Of these, ordinarily compounds of sodium or potassium are preferable, and carbonates of sodium or potassium are preferable. That is, sodium carbonate and potassium carbonate are particularly preferable. Note that a single type of these alkali metal compounds may be used, or depending on the case, two or more types may be combined and used as a mixture.

From the perspectives of the ease of supply and reactivity, the alkali metal compound that is used in the polycondensation step is preferably in the form of solid granules having a fine particle size. More specifically, the average particle size of the alkali metal compound is 95 µm or less, preferably from 5 to 80 µm, more preferably from 7 to 60 µm, and particularly preferably from 10 to 30 µm. Note that in the present embodiment, the term average particle size means the mass average particle size. This mass average particle size can be measured using an analysis instrument for particle analysis.

In the present embodiment, the method for pulverizing the alkali metal compound is not particularly limited, and for example, pulverization can be performed using a device such as a homogenizer or an impact mill.

In the polycondensation step, the usage amount of the alkali metal compound is not particularly limited, but from the perspective of economic performance, the equivalent of the alkali metal compound per 1 equivalent of hydroxy groups of the aromatic dihydroxy compound is preferably from 1 to 2.5, more preferably from 1.01 to 2, and even more preferably from 1.02 to 1.5. Note that for both the aromatic dihydroxy compound and the alkali metal carbonate, 1 mole corresponds to 1 equivalent, and 2 moles of each of the alkali metal hydrogen carbonate and the alkali metal hydroxide correspond to 1 equivalent.

Furthermore, the usage amount of the aromatic dihalide compound is not particularly limited, but from the perspective of achieving a high molecular weight, the molar ratio of the aromatic dihalide compound to the aromatic dihydroxy compound is from 0.9 to 1.1, preferably from 0.95 to 1.05, more preferably from 0.97 to 1.03, and even more preferably from 0.98 to 1.02.

Polycondensation Conditions

Next, the polycondensation conditions in the polycondensation step are described.

With the present production method, the polycondensation step is carried out in a hydrophilic solvent, which is the reaction solvent, under pressurized conditions.

As specific examples of the hydrophilic solvent that is used in the polycondensation step, solvents that are hydrophilic and are a liquid at room temperature are preferable. Examples of such solvents include N,N-dimethylformamide (DMF), N,N-diethylformamide, N,N-dipropylformamide, and other N,N-dialkyl formamides; N,N-dimethylacetamide, N,N-diethylacetamide, N,N-dipropylacetamide, and other N,N-dialkyl acetamides; N-methyl-2-pyrrolidone (NMP), N-ethyl-2-pyrrolidone, N-propyl-2-pyrrolidone, N-cyclohexyl-2-pyrrolidone, and other N-alkyl-2-pyrrolidones; N,N'-dimethylimidazolidinone, N,N'-diethylimidazolidinone, N,N'-dipropylimidazolidinone, and other N,N'-dialkyl imidazolidinones; N-methyl caprolactam, N-ethyl caprolactam, N-propyl caprolactam, and other N-alkyl caprolactams; sulfolane, dimethyl sulfone, diethyl sulfone, diisopropyl sulfone, and other sulfones; and dimethyl sulfoxide, diethyl sulfoxide, and other sulfoxides.

Furthermore, as the abovementioned solvent, N-alkyl-2-pyrrolidone, N,N'-dialkyl imidazolidinone, and N-alkyl-caprolactam are preferable. Of these, N-alkyl-2-pyrrolidone, and particularly N-methyl-2-pyrrolidone are favorably used.

These hydrophilic solvents may be used alone, or two or more types may be appropriately combined and used.

With the present production method, the content of monomers per 100 parts by mass of the hydrophilic solvent before desalting polycondensation is preferably from 1 part by mass to 200 parts by mass, more preferably from 5 parts by mass to 100 parts by mass, and even more preferably from 10 parts by mass to 50 parts by mass. PAEK with an even higher degree of polymerization can be produced by setting the content of the monomers to the above-described range.

The pressurization method in the polycondensation step is not particularly limited, but the step is preferably carried out in a reactor in which the gage pressure is greater than 0 MPa and not greater than 1.0 MPa, preferably not greater than 0.7 MPa, and more preferably not greater than 0.5 MPa.

In the present production method, the polymerization temperature in the polycondensation step is at or above the boiling point of the hydrophilic solvent at ambient pressure.

With the present production method, from the perspective of obtaining high molecular weight PAEK, the polymerization temperature in the polycondensation step is preferably from 100° C. to 320° C., more preferably from 150° C. to 300° C., and even more preferably from 170° C. to 280° C. The polymerization temperature is the temperature under pressurized conditions.

With the present production method, the reaction time of the desalting polycondensation reaction is not particularly limited, but is ordinarily from 0.1 hours to 10 hours, preferably from 0.5 hours to 7 hours, and more preferably from 1 hour to 5 hours. Note that the desalting polycondensation reaction may be terminated by methods such as ceasing the heating and adding a reaction terminator. For cases in which the reaction is a continuous type, the average residence time is used as the reaction time.

Note that the action mechanism of the present production method is not clear, but, for example, it is hypothesized that when NMP is used as the hydrophilic solvent in the presence of an alkali metal compound, a side reaction occurs in which an NMP ring-opened product is produced, and this NMP ring-opened product is added to the PAEK terminal.

Next, the cooling step of the present production method is described.

Cooling Step

In the present production method, the cooling step is a step in which the reaction mixture that is obtained in the polycondensation step is cooled after the completion of desalting polycondensation. The cooling rate when cooling the reaction mixture is not particularly limited, and for example, the reaction mixture may be appropriately cooled until the reaction mixture reaches room temperature.

When recovering the reaction mixture, the reaction mixture is preferably recovered in a slurry state by controlling the weight ratio of the raw material monomers to the hydrophilic solvent.

In the present production method, the polymer content in terms of monomers at the time of cooling in the cooling step is from 1 part by mass to 50 parts by mass, preferably from 3 parts by mass to 30 parts by mass, more preferably from 5 parts by mass to 25 parts by mass, and particularly preferably from 8 parts by mass to 20 parts by mass, per 100 parts by mass of the hydrophilic solvent, in the reaction mixture. Note that in the present specification, the "polymer content in terms of monomers with respect to the hydrophilic solvent" means the "polymer content in terms of all raw material monomers with respect to the hydrophilic solvent".

After the completion of desalting polycondensation, for cases in which the amount of the polymer before the implementation of the cooling step exceeds 50 parts by mass in terms of monomers per 100 parts by mass of the hydrophilic solvent, a hydrophilic solvent is added to the reaction mixture to adjust the polymer content to within the above-described range. For cases in which the polymer content in terms of monomers per 100 parts by mass of the hydrophilic solvent is less than 1 part by mass, the hydrophilic solvent is removed through a method such as evaporation to adjust the polymer content to the above-described range. When the polymer content in the reaction mixture at the time of cooling is set to the above-described range, at normal temperature, the reaction mixture obtained by cooling becomes a suspension state between a liquid and a solid, or in other words, a slurry state. This facilitates post-processing such as the recovery of PAEK. Note that as the hydrophilic solvent that is added to the reaction mixture, the hydrophilic solvents presented as examples for the polycondensation step can be used. In addition, the amount of the hydrophilic solvent that is added to the reaction mixture may be appropriately set.

A hydrophilic solvent is added to the reaction mixture after the completion of the desalting polycondensation and before the implementation of the cooling step. Adding the hydrophilic solvent provides effects of being able to prevent the solidification of the reaction mixture and being able to adjust the polymer content in terms of monomers in the reaction mixture. The time for the addition of the hydrophilic solvent to the reaction mixture is preferably before the startup of the cooling step, and more preferably before the PAEK deposits before the startup of the cooling step.

Note that the reaction mixture that has become a slurry state includes reaction mixtures that contain a solvent, a byproduct salt, and PAEK.

The PAEK that is obtained by the present production method has a very high reduced viscosity from 0.15 to 1.5. In the present specification, a high degree of polymerization is synonymous with a high reduced viscosity. Therefore, according to the present production method, PAEK with a high degree of polymerization can be stably obtained. Also, according to the present production method, the reaction mixture that contains PAEK is in a slurry state with fluidity at normal temperature (25° C.). Therefore, the reaction mixture is easily transferred. Furthermore, the present production method may also include the below-described recovering step.

Recovering Step

The recovering step of the present production method is a step of recovering the reaction mixture obtained through the cooling step. According to the present production method, as described above, the reaction mixture is in a slurry state with fluidity at normal temperature, and therefore the reaction mixture can be easily recovered.

In addition to the recovering step, the present production method may also further include a separating step, which is described next.

Separating Step

The separating step of the present production method is a step in which after the recovering step, the reaction mixture is separated into a polymerization product and a solvent. The method for separating the reaction mixture is not particularly limited, and for example, may be performed by washing the reaction mixture with the hydrophilic solvent, water, an inorganic acid aqueous solution, methanol, ethanol, or other such alcohols, acetone, and the like or combinations of these, and then carrying out solid-liquid separation using filter paper or the like. Through this, the separated solvent can be refined and reused.

The method for producing PAEK according to the present embodiment may be any of a batch type method, a semi-batch type method, a continuous type method, and a combination thereof.

A method for producing polyaryletherketone according to one aspect of the present invention includes: a polycondensation step in which desalting polycondensation is carried out in a reaction solvent; and a cooling step in which after the completion of desalting polycondensation, a reaction mixture is cooled; the polycondensation step being carried out in a hydrophilic solvent under pressurized conditions; a polymerization temperature in the polycondensation step being at or above the boiling point of the hydrophilic solvent at ambient pressure; and the polymer content in terms of monomers at the time of cooling in the cooling step being from 1 part by mass to 50 parts by mass, per 100 parts by mass of the hydrophilic solvent in the reaction mixture.

SUMMARY

A method for producing polyaryletherketone according to one aspect of the present invention includes: a polycondensation step of carrying out desalting polycondensation in a reaction solvent; and a cooling step of cooling a reaction mixture obtained in the polycondensation step after the completion of the desalting polycondensation; the polycondensation step being carried out in a hydrophilic solvent under pressurized conditions; a polymerization temperature in the polycondensation step being at or above the boiling point of the hydrophilic solvent at ambient pressure; and the polymer content in terms of monomers at the time of cooling in the cooling step being from 1 part by mass to 50 parts by mass, per 100 parts by mass of the hydrophilic solvent in the reaction mixture.

In one aspect of the present invention, the polycondensation step is preferably carried out inside a reactor at a gage pressure of greater than 0 MPa and not greater than 1.0 MPa.

In addition, in one aspect of the present invention, the polymerization temperature in the polycondensation step is preferably from 100° C. to 320° C.

Furthermore, in one aspect of the present invention, the content of monomers per 100 parts by mass of the hydrophilic solvent prior to desalting polycondensation is preferably from 1 part by mass to 200 parts by mass.

Furthermore, one aspect of the present invention preferably includes adding a hydrophilic solvent to the reaction mixture after the completion of desalting polycondensation and before the implementation of the cooling step.

Furthermore, one aspect of the present invention preferably further includes a recovering step of recovering the reaction mixture obtained through the cooling step.

Furthermore, one aspect of the present invention preferably also includes a separating step of separating the reaction mixture into a polymerization product and a solvent after the recovering step.

Furthermore, in one aspect of the present invention, the hydrophilic solvent is preferably N-methyl-2-pyrrolidone.

Embodiments of the present invention are described in even greater detail through the presentation of examples below. However, as a matter of course, the present invention is not limited to the following examples, and various aspects of the details are obviously possible. Furthermore, the present invention is not limited to the above-described embodiments, various modifications are possible within the scope presented by the claims, and embodiments obtained by combining, as appropriate, the respectively disclosed technical means are also included in the technical scope of the present invention. In addition, all of the documents described in the present specification are cited as references.

EXAMPLES

Example 1

The desalting polycondensation of 22.038 g of 4,4'-difluorobenzophenone (DFBP) and 11.011 g of hydroquinone (HQ) as an aromatic dihydroxy compound was carried out in N-methyl-2-pyrrolidone (NMP) in the presence of potassium carbonate (($K_2CO_3$) as an alkali metal compound. After the desalting polycondensation reaction, the reaction product was cooled to room temperature. At room temperature, the reaction product after cooling was in a slurry state. Note that the conditions when carrying out desalting polycondensation were as follows.

(DFBP+HQ)/NMP(100 parts by mass)=20 parts by mass    Reaction system concentration:

Molar ratio: DFBP/HQ=1.01
$K_2CO_3$/HQ=1.1
Polymerization time: Polymerization was performed at 180° C. for 0.5 hours, and was then performed at 260° C. for 1.0 hours.
Polymerization pressure: 0.3 MPa The reaction mixture in a slurry state that was obtained through the desalting polycondensation reaction was washed with water and methanol, and then subjected to solid-liquid separation with filter paper (No. 5A). The reduced viscosity and melting point of the obtained solid component were measured. The obtained solid component was PEEK with a reduced viscosity of 0.42 (dL/g) and a melting point of 336° C. Note that the reduced viscosity and boiling point were respectively measured in the following manner.

Preparation of Sample Solution 0.1 g of the solid component obtained as described above and 10 mL of 4-chlorophenol were enclosed in a pressure-resistant screw vial, and heated in a 180° C. oil bath for 20 minutes while stirred, the solid component was dissolved, and thereby a solution was obtained, Next, the obtained solution was cooled to room temperature, after which 3 mL of this solution was diluted with 7 mL of o-dichlorobenzene to prepare a sample solution.

Reduced Viscosity Measurements

The sample solution obtained as described above was filtered with filter paper (No. 7), and was measured at 35° C. with an Ubbelohde viscometer.

Melting Point Measurements

Measurements were performed in the following manner using a differential scanning calorimeter (DSC Q100 available from TA Instruments). Namely, 3 mg of the obtained sample were enclosed in an aluminum pan, and heated from 30° C. to 400° C. at a rate of 20° C./minute with an inflow of nitrogen (50 mL/min), and the melting point was measured.

Example 2

Desalting polycondensation was performed in the same manner as Example 1 with the exception that the reaction system concentration of Example 1 was changed in the following manner.

(DFBP+HQ)/NMP(100 parts by mass)=30 parts by mass    Reaction system concentration:

After the completion of desalting polycondensation reaction, 220.328 g of NMP was added to the reaction mixture, after which the reaction mixture was cooled to room temperature.

The reaction mixture after cooling was in a slurry state at room temperature.

Next, the reaction mixture in a slurry state was subjected to solid-liquid separation in the same manner as Example 1. The reduced viscosity and melting point of the obtained solid component were measured. The obtained solid component was PEEK with a reduced viscosity of 1.29 (dL/g) and a melting point of 336° C.

Example 3

A sample for which the mixing ratio of the NMP and PEEK (450P available from Victrex Company, reduced viscosity of 1.18) had been changed was enclosed in a pressure-resistant pan, and heated and cooled twice from 30° C. to 400° C. at a rate of 20° C./min with an inflow of nitrogen (50 mL/min). The melting point and cooling crystallization temperature of the sample that was obtained from the result of the second heating and cooling were as shown in Table 1. Note that a differential scanning calorimeter (DSC Q100 available from TA Instruments) was used to measure the melting point and cooling crystallization temperature.

TABLE 1

| No. | PEEK Percentage (wt. %) | NMP Percentage (wt. %) | Tm [° C.] | Tc [° C.] |
|---|---|---|---|---|
| 1 | 10 | 90 | 228 | 136 |
| 2 | 20 | 80 | 234 | 147 |
| 3 | 30 | 70 | 241 | 166 |
| 4 | 40 | 60 | 256 | 174 |

TABLE 1-continued

| No. | PEEK Percentage (wt. %) | NMP Percentage (wt. %) | Tm [° C.] | Tc [° C.] |
|---|---|---|---|---|
| 5 | 50 | 50 | 275 | 193 |
| 6 | 100 | 0 | 339 | 285 |

Tm: melting point
Tc: cooling crystallization temperature

From the results of Table 1, it is clear that with Examples 1 and 2, the polymerization temperature was at or above 202° C., the boiling point of NMP, and was in a range in which the PEEK remained in a dissolved state.

INDUSTRIAL APPLICABILITY

As an engineering resin, the polyaryletherketone of the present invention can be used as a material in various types of fields such as the automotive and precision equipment industries and the like, for example.

The invention claimed is:

1. A method for producing crystalline polyaryletherketone, the method comprising:
   a polycondensation step of carrying out desalting polycondensation of raw material monomers in a reaction solvent; and
   a cooling step of cooling a reaction mixture obtained in the polycondensation step after completion of the desalting polycondensation, to a cooling crystallization temperature or lower;
   the polycondensation step being carried out in a hydrophilic solvent under pressurized conditions;
   a polymerization temperature in the polycondensation step being at or above the boiling point of the hydrophilic solvent at ambient pressure;
   setting a polymer content by controlling a weight ratio of the raw material monomers to the hydrophilic solvent, wherein the weight ratio is from 1 part by mass to 50 parts by mass, per 100 parts by mass of the hydrophilic solvent in the reaction mixture at the time of cooling in the cooling step; and
   the reaction mixture after the cooling step being in a slurry state;
   the raw material monomers being an aromatic dihalide compound and an aromatic dihydroxy compound, and the aromatic dihalide compound being selected from the group consisting of 4,4'-difluorobenzophenone and 4,4'-dichlorobenzophenone.

2. The method for producing crystalline polyaryletherketone according to claim 1, wherein the polycondensation step is carried out inside a reactor at a gage pressure of greater than 0 MPa and not greater than 1.0 MPa.

3. The method for producing crystalline polyaryletherketone according to claim 1, wherein the polymerization temperature in the polycondensation step is from 100° C. to 320° C.

4. The method for producing crystalline polyaryletherketone according to claim 1, wherein a weight ratio of the raw material monomers to the hydrophilic solvent is from 1 part by mass to 200 parts by mass per 100 parts by mass of the hydrophilic solvent prior to the desalting polycondensation.

5. The method for producing crystalline polyaryletherketone according to claim 1, further comprising adding a hydrophilic solvent to the reaction mixture after completion of the desalting polycondensation and before implementation of the cooling step.

6. The method for producing crystalline polyaryletherketone according to claim 1, further comprising a recovering step of recovering a reaction mixture obtained through the cooling step.

7. The method for producing crystalline polyaryletherketone according to claim 6, comprising a separating step of separating the reaction mixture into a polymerization product and a solvent after the recovering step.

8. The method for producing crystalline polyaryletherketone according to claim 1, wherein the hydrophilic solvent is N-methyl-2-pyrrolidone.

9. The method for producing crystalline polyaryletherketone according to claim 1, wherein the weight ratio is from 8 parts by mass to 50 parts by mass.

10. The method for producing crystalline polyaryletherketone according to claim 1, wherein the weight ratio is from 20 parts by mass to 50 parts by mass.

11. The method for producing crystalline polyaryletherketone according to claim 1, wherein the weight ratio is from 20 parts by mass to 30 parts by mass.

12. The method for producing crystalline polyaryletherketone according to claim 1, wherein the aromatic dihydroxy compound is hydroquinone.

13. The method for producing crystalline polyaryletherketone according to claim 1, wherein the reaction mixture after the cooling step comprises solid polyaryletherketone.

* * * * *